March 9, 1954     P. J. KENT     2,671,891
VEHICLE ELECTRICAL SYSTEM
Filed Nov. 29, 1950     2 Sheets-Sheet 1
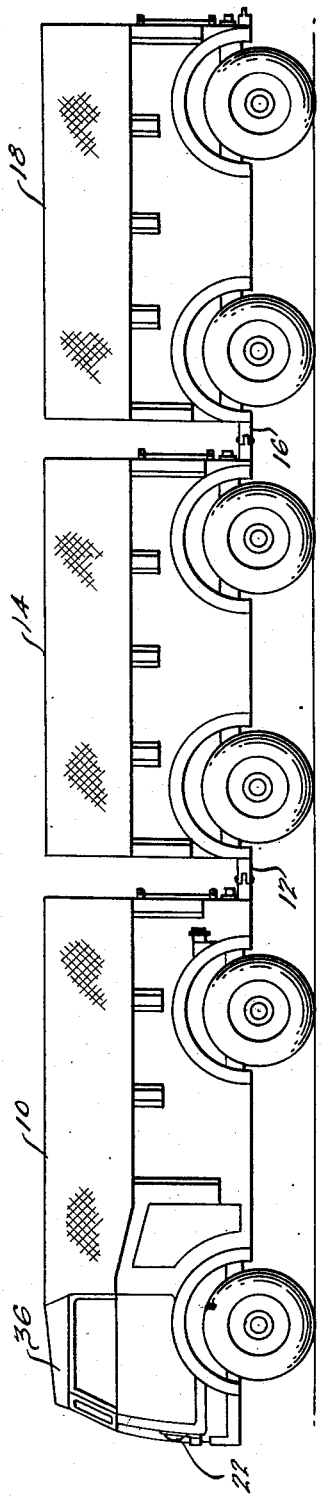
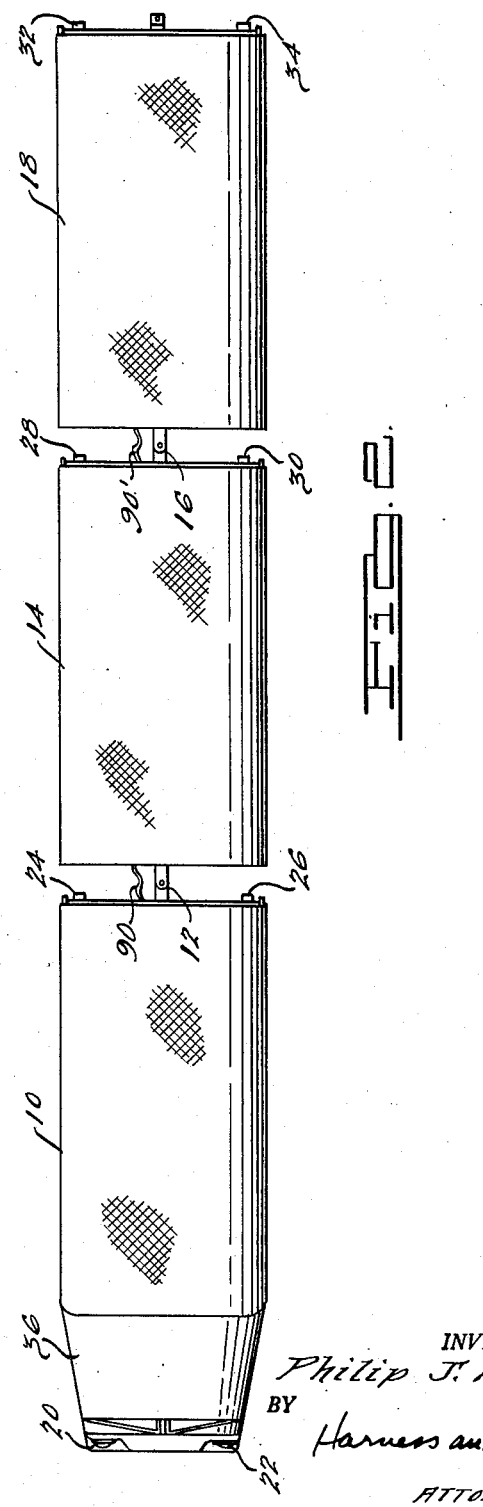
INVENTOR.
Philip J. Kent.
BY Harness and Harris
ATTORNEYS.

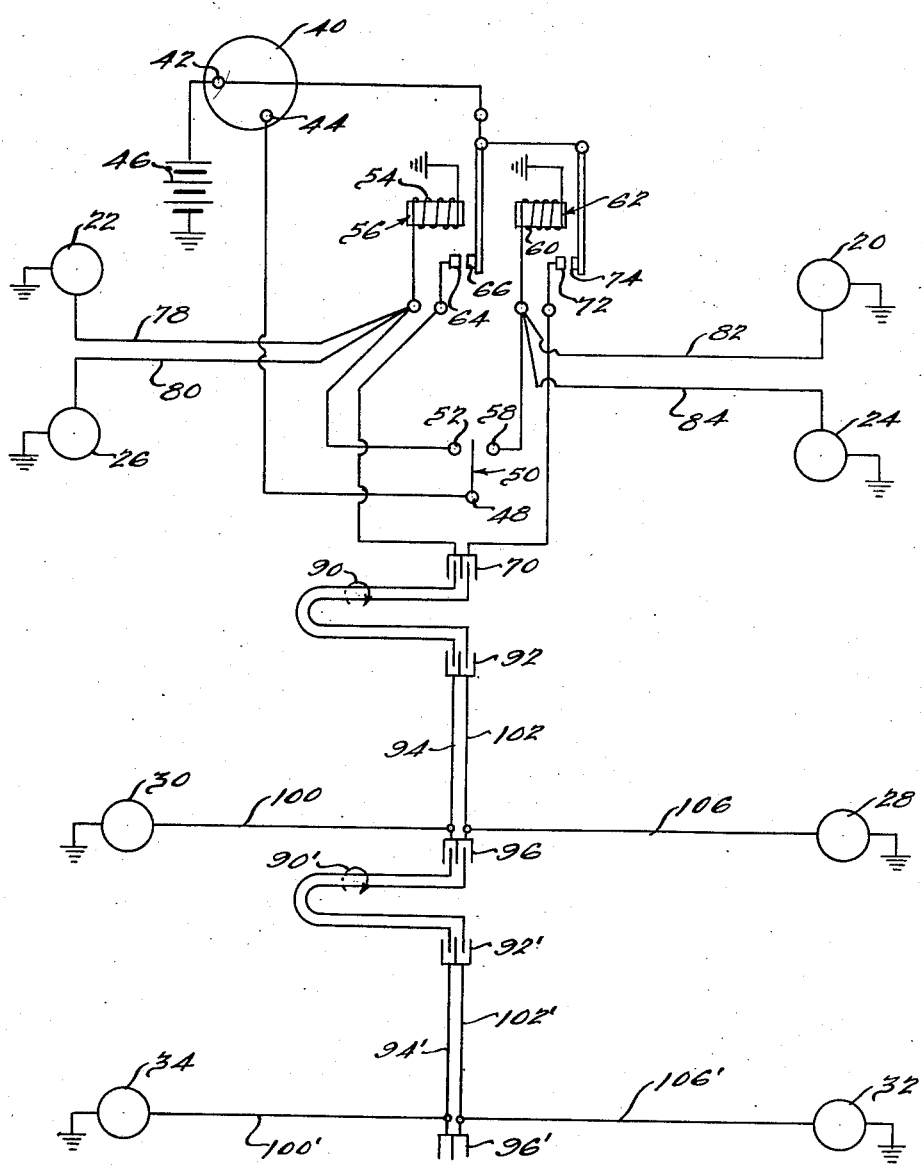

Patented Mar. 9, 1954

2,671,891

UNITED STATES PATENT OFFICE 2,671,891

VEHICLE ELECTRICAL SYSTEM

Philip J. Kent, Birmingham, Mich., assignor to Chrysler Corporation, Highland Park, Mich., a corporation of Delaware Application November 29, 1950, Serial No. 198,133

4 Claims. (Cl. 340—81)

This invention relates to motor vehicle electrical systems and has particular reference to the turn signal electrical system of the vehicle.

This invention provides improvements in the turn indicating system disclosed in the copending application of Dickson, filed November 28, 1950, Serial No. 197,943.

The principal object of my invention is to provide a truck and trailer combination with an improved turn signal system which will effectively operate regardless of the number of trailers added to or subtracted from the combination.

Another object of my invention is to provide an indicating system of the aforementioned type which is easily as well as economically manufactured.

My invention deals with a truck and trailer combination provided with an improved turn signal system having a flasher member which has a relay coil and the indicating lamps on the truck for a constant load. The contacts of the relay open and close at the frequency of the flasher member and the indicating lamps on the truck or trucks are each connected in series with the contacts and the electrical power source of the vehicle. It will be seen, therefore, that the indicating lamps of any number of trailers may be added to or subtracted from the system without effecting the loading of the flasher member.

Other objects and advantages will become more apparent from the following description of one embodiment of my invention, reference being had to the accompanying drawings in which:

Fig. 1 is a side elevational view of a truck and two trailers illustrating the general location of portions of the turn signal device.

Fig. 2 is a plan view of the truck and trailers shown in Fig. 1.

Fig. 3 is a schematic diagram of the turn signal system of both the truck and trailers.

In the drawings, I have shown a motor vehicle truck 10 which is connected through conventional linkage means 12 to a vehicle trailer 14. The trailer 14 is connected through conventional linkage means 16 to a trailer 18. The truck 10 is provided with forward turn indicating lamps 20 and 22 as well as with rear turning indicating lamps 24 and 26. Similarly, the trailer 14 is provided with rearwardly disposed lamps 28 and 30 and the trailer 18 is provided with rearwardly disposed turn indicating lamps 32 and 34. The main portion of the turn signal indicating device is disposed within the cab 36 of the truck 10.

Referring now particularly to Fig. 3, the turn indicating system comprises a flasher member 40 having contacts 42 and 44. The contact 42 is connected to one terminal of a source of electrical energy, such as the battery 46, the other terminal thereof being grounded. The terminal 44 of the flasher member 40 is connected to the center pole 48 of a single pole double throw switch generally designated by the numeral 50. The switch 50 is provided with a contact 52 which is connected to one terminal of a coil 54 of a relay generally designated by the numeral 56, the other terminal of the coil 54 being grounded. The switch 50 is also provided with a contact 58 which is connected to one side of a relay coil 60 of a relay, generally designated by the numeral 62, the other side of the coil being grounded. The relay 56 is provided with contact members 64 and 66, the former being connected to a cable 68 which extends rearwardly of the truck 10 to a connector member 70. The contact member 66 of the relay 56 is connected through the contact 42 of the flasher member 40 to the battery 46. Similarly, the relay 62 is provided with contact members 72 and 74, the former being connected by the cable 76 to the connector 70. The contact member 74 of the relay 62 is connected through the contact member 42 of the flasher member 40 to the battery 46. The lamps 22 and 26 are connected through cables 78 and 80 to contact 52 so that these lamps will be energized when the coil 54 is energized. Similarly, the indicating lamps 20 and 24 are connected through cables 82 and 84 to the contact 58 so that they will be energized when the coil 60 is energized. By operating the switch 50 and thereby connecting the terminal 48 with the terminal 52, the coil 54 of the relay 56 will be energized. When the switch is in this position, the left hand lamps 22 and 26 are energized thereby indicating a left turn of the vehicle. Similarly, when the contact 48 of the switch 50 is connected to the contact 58, the relay coil 60 of the relay 62 is energized and the lamps 20 and 24 are energized to indicate a right hand turn of the truck 10.

The flasher member 40 is of a conventional design and allows the passage of electric current between the terminals 42 and 44 thereof at a predetermined frequency. As the flasher member 40 is in the circuit between the source of electrical energy and the relays 56 and 62 the relays will be energized and de-energized at the frequency of the flasher member. As a result, the contact members of the relays will engage and disengage at the frequency of the flasher member and the indicating lamps will blink on and off at this frequency. It should be noted that flasher members of the type shown at 40 depends upon a constant load to maintain a constant frequency when operating. It will also be seen that depending upon which position the switch 50 is in either the relay coil 54 or the relay coil 60 together with the lamps 22 and 26 or 20 and 24, respectively, will act as the load of the flasher member 40. By this electrical design, the same amount of current will always pass through the member 40 when the electrical turn indicating system is operating. In my improved system, the indicating lamps, such as 20, 22, 24 and 26, are utilized as the electrical load for the flasher member 40. If this system was utilized without the relays and additional lamps were needed in the circuit, it would be necessary to replace the flasher member with another flasher member of a suitable current carrying capacity since any additional lamps added in parallel with the lamps on the truck would materially change the load on the flasher member and therefore change its frequency. In many cases, this additional load by adding more turn indicating lamps would make the flasher member entirely inoperable.

By my improved design any number of indicating lamps may be added to the entire system without changing the load on the flasher member 40. Referring again to Fig. 3, the connector 70 is connected by a cable 90 to a connector 92 disposed at the forward end of the trailer 14. The connector 92 is provided with a cable 94 which extends rearwardly of the vehicle to a connector 96. A rear left turn lamp 30 disposed at the rear end of the trailer 14 is connected to a cable 100 to the cable 94. Similarly, the connector 94 is provided with a cable 102 which extends rearwardly of the trailer to the connector 96. A right rear turning indicating lamp 28 is connected with a cable 106 to the cable 102. The cables 94 and 102 are connected through the cable 90 to the cables 68 and 76, respectively, so that the lamps 30 and 28 are connected through the contact members 64 and 66 and 72 and 74, respectively, to the battery 46. The trailer 18, as heretofore set forth, is provided with turn indicating lamps 34 and 32 of the remaining electrical components carried by the trailer 18 toward the indicating system are identical to those carried by the trailer 14 and the identical electrical components have been given primed numbers.

It will be seen that the lamps 22 and 26 are connected in parallel with the relay coil 54 and that all three are connected in series with the flasher member 40 and the battery 46 when the arm of switch 50 engages contact 52. The lamps 22 and 26 and the coil 54 effectively determine the operating current which passes in the flasher 40 at contact 42 and out at contact 44. The lamps 20 and 24 and coil 60 have the identical effect and establish the same current passing through the flasher 40 when the blade of the switch 50 engages contact 58. The lamps, like 28, 30, 32 and 34 which may be added to the electrical system when additional trailers are added to the tractor, are all connected in series with the flasher 40 and battery 46 through either the contacts of relay 56 or 62 depending on the position of the switch 50. The contact 42 of the flasher member 40 merely acts as a binding post for the connection between the contacts 66 and 74 of the relays 56 and 62, respectively, and the battery 46.

It will be seen, from Fig. 3, that any number of trailers could be added or subtracted from the truck 10 without changing the electrical load on the flasher member 40. This is true as all of the indicating lamps on each side of the trailers 14 and 18 are connected in parallel and these parallel circuits are connected in series with the contact members of the relays, the flasher member 40 and the battery 46. All of the indicating lamps have one terminal thereof grounded, it being assumed that there is a good ground connection between all of the components of the truck and trailer combination.

By my improved construction, the lamps 22 and 26 and 20 and 24 along with the relay coils 54 and 60, respectively, provide a constant load for the flasher and these lamps flash on and off when energized since they are connected to the battery 46 directly through the flasher member 40. On the other hand, the lamps 28, 30, 32 and 34 on the trailers are flashed on and off due to the intermittent operation of the contact members of the relay.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. An electrical turn signal system for a vehicle comprising a source of electrical energy, a flasher member connected with said source, relay means including a coil and contact members, first circuit means connecting said flasher member and said relay coil in series, a switch in said first circuit means for selectively controlling the operation of said circuit means, electrical load means, and second circuit means connecting said load means in series with said flasher member, said contact member being connected to said source and being adapted to facilitate the operation of additional load means without changing the amount of current passing through said flasher member.

2. An electrical turn signal system for a vehicle comprising a source of electrical energy, a flasher member connected to said source, first and second relays each including a coil and contact members, first circuit means connecting each said coils in series with said flasher member, switch means in said first circuit means for selectively operating either of said relays, electrical load means, and second circuit means connecting said load means with said contact members being connected to said source and being adapted to facilitate the operation of additional electrical load means without effecting the amount of current passing through said flasher member.

3. An electrical turn signal system for a vehicle comprising a source of electrical energy, a flasher member adapted to operate at a predetermined frequency and connected to said source, first and second relays each having a coil and contact members, a switch, first circuit means connecting said switch in series with said flasher member, second circuit means connecting said switch with the coils of said relays, said switch being adapted to selectively energize either of said relay coils to effect making and breaking of said contact members at the aforementioned predetermined frequency, indicating lamps, and third circuit means connecting said lamps in series with said switch and flasher member, said contact members when made being connected to said source and being adapted to facilitate the operation of additional indicating lamps without effecting the amount of current passing through said flasher member.

4. An electrical turn signal system for a truck and trailer combination comprising a source of electrical energy, a flasher member connected to said source and operable at a predetermined frequency, first and second relays each having coils and contact members, a switch connected in series with said flasher member, first circuit means connecting the coils of said relays in series with said switch and said flasher member, said switch being adapted to selectively energize either of said relays so that said contact members engage and disengage at said aforementioned predetermined frequency, first indicating lamps carried by said truck, second circuit means connecting said lamps in series with said switch and flasher member, second indicating lamps carried by said trailer, and third circuit means connecting said second indicating lamps in series with said contact members and said source.

PHILIP J. KENT.

References Cited in the file of this patent

UNITED STATES PATENTS

| Number | Name | Date |
| --- | --- | --- |
| 2,005,963 | Axelberg | June 15, 1935 |
| 2,122,508 | Bell | July 5, 1938 |
| 2,238,394 | Murray, Jr. | Apr. 15, 1941 |
| 2,456,242 | Bailey | Dec. 14, 1948 |
| 2,578,284 | Bowman | Dec. 11, 1951 |